Patented Sept. 3, 1940

2,213,474

UNITED STATES PATENT OFFICE 2,213,474

GUANYL AND BIGUANYL COMPOUNDS

Bruno Puetzer, Albany, N. Y., assignor to Winthrop Chemical Company, Inc., a corporation of New York No Drawing. Original application December 14, 1934, Serial No. 757,547. Divided and this application April 20, 1937, Serial No. 138,063. In Germany December 16, 1933

5 Claims. (Cl. 260—564)

This invention relates to new products which display a bactericidal action.

In accordance with the present invention products displaying a bactericidal action are obtainable by the manufacture of guanyl- and biguanyl compounds wherein the carbon atom of the guanyl group —C(=NH)—NH$_2$ or the one carbon atom of the biguanyl group

—C(=NH)—NH—C(=NH)—NH$_2$ is connected by an amino group with a higher aliphatic radical containing from about 10 to about 16 carbon atoms.

In accordance with the present invention the said new guanyl- and biguanyl compounds are obtained, for instance, by condensation of a higher primary or secondary aliphatic amine containing the aliphatic radical of from about 10 to about 16 carbon atoms with cyanamide, dicyandiamide or with an alky- or arylalkylether of isourea, isothiourea, guanylisourea or guanylisothiourea. The components may also be used in the form of their salts with acids. The condensation of cyanamide with a primary aliphatic amine proceeds, for instance, in accordance with the following equation:

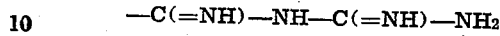

Cetylamine and dicyandiamide react for instance in the following manner while forming a biguanyl compound:

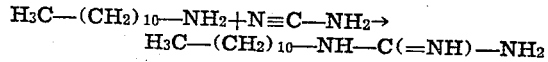

The condensation between the higher aliphatic amine and an isothiourea-alkylether performs while splitting off alkyl mercaptane in the following manner:

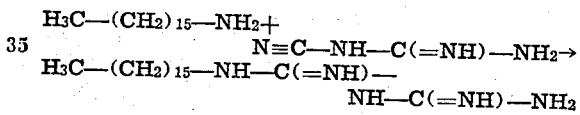

The other condensations referred to above proceed in a similar manner.

Instead of the higher aliphatic alcohols and mercaptanes their reactive esters likewise may be used in this reaction, for instance, the esters with the hydrohalic acids and with aromatic sulfonic acids. Such esters may be reacted with guanidine, biguanidine or with the salts of the said compounds. Cetylbromide, for instance, reacts with guanidine with the formation of cetylguanidine-hydrobromide.

The new guanyl- and biguanyl compounds may be further obtained by reacting upon higher molecular cyanamides containing an aliphatic radical of from 11 to about 16 carbon atoms with ammonia, amines, guanidines or their salts. Dodecylcyanamide, for instance, yields with ammonia dodecylguanidine and with guanidine dodecylbiguanide.

The above mentioned higher aliphatic radicals of from about 10 to about 16 carbon atoms may be saturated or unsaturated and may contain substituents, such as the hydroxy, alkoxy and amino group. The carbon chain of the higher aliphatic radical may be interrupted by other members or groups, for instance, an ether-like bound oxygen or sulfur group, by amino groups or even by cyclic groups. A cyclic group may also be part of the connecting member between the guanyl radical and the higher alipahtic radical. The amino groups of the guanyl- and biguanyl radical may be substituted by alkyl groups. The amino groups of the guanyl radical may also be connected with one another by an alkylene group, so that the guanyl group is a member of a heterocyclic nucleus.

The new guanyl and biguanyl compounds are generally crystalline products. In the form of the free bases they are practically insoluble in water but soluble in organic solvents, such as alcohols, ether, acetone and the like. In the form of their salts with mineral acids, for instance, the hydrohalic acids, sulfuric acid and nitric acid, as well as in the form of their salts with organic acids, such as acetic, lactic, citric and benzoic acid, the new products are soluble in water and in alcohol but insoluble in ether. In view of their excellent bactericidal activity the new products may be used for instance as antiseptics, further for outer disinfections, for instance, for the disinfection of medical instruments, bandages and the like. Since the new compounds likewise display a considerable wetting-, foaming- and dispersing action, they may likewise find application as disinfecting cleaning agents. Because of the above specified properties the new compounds are also suitable as additions to cosmetica, such as face lotions, gargles and the like. They may also serve as a means to dissolve water-insoluble substances, such as medicines, ethereal oils and the like. Because of their bactericidal action they are also suitable as preserving agents.

The invention is further illustrated by the following examples without being restricted thereto:

*Example 1.*—18.5 grams of n-dodecylamine, 10 ccs. of alcohol and 18.5 grams of S-ethylisothiourea-hydrobromide are heated in the waterbath for 6 hours. After cooling the separated crystals are filtered with suction, washed with alcohol and ether and recrystallized from alcoholether. The hydrobromide of n-dodecylguanidine thus obtained forms colorless crystals melting at 82° C. It is soluble in water and has soap-like properties. The free n-dodecylguanidine crystallizes from a mixture of benzene and petroleum ether in colorless crystals melting at 96° C.

*Example 2.*—9.3 grams of dodecylamine, 6 ccs. of water and 10.9 grams of S-ethylguanylisothiourea-hydrobromide (colorless crystals melting at 164° C. obtained by treating guanylthiourea with ethylbromide in alcoholic solution) are heated on the water-bath until the formation of bubbles has ceased. The ethylmercaptane formed is distilled off in vacuo, the residue dissolved in water, the solution rendered alkaline and extracted with ether. On drying the ether and evaporation, the dodecylbiguanide separates in colorless crystals melting at 96° C. It forms a pink colored copper complex salt melting at 219° C. Its solution in the calculated quantity of dilute hydrochloric acid has soap-like properties.

*Example 3.*—5 grams of aminoethyl-dodecyl-sulfide (boiling at 156° C. under 3 mm. pressure, melting at 265° C. obtained from dodecylmercaptane and aminoethylbromide), 2 ccs. of alcohol and 3.8 grams of S-ethylisothiourea-hydrobromide are heated in the water-bath for 20 minutes. After the reaction mixture has been dissolved in ether it is filtered and cooled with an ice-common salt mixture. The dodecylthioethyl-guanidinhydrobromide crystallizes in colorless crystals melting at 58° C. It has soap-like properties.

*Example 4.*—6.2 grams of aminoethyldodecylsulfide, 2 ccs. of alcohol and 5.5 grams of S-ethylguanylisothiourea-hydrobromide are heated on the water-bath for half an hour. After the addition of ether the mixture is filtered and cooled with an ice-common salt mixture. After standing for a longer period of time the dodecyl-thioethylbiguanid-hydrobromide crystallizes in colorless crystals melting at 90° C. It has soap-like properties.

*Example 5.*—23 grams of m-aminophenyldodecylether-hydrochloride, 100 ccs. of water and 10 grams of dicyandiamide are heated to boiling for two hours. The reaction mixture is dissolved with about the same quantity of methyl alcohol, filtered and the filtrate treated with excess ammonia. The precipitate separating is recrystallized from alcohol-ether. The 3-biguanidinophenyl-dodecyl-ether forms crystals melting at 207° C.

The m-aminophenyldodecylether-hydrochloride specified above as the starting material is obtained in the following manner:

42 grams of m-nitrophenol are heated to boiling in a solution of 6.9 grams of sodium in 160 ccs. of absolute alcohol and 75 grams of dodecylbromide are added drop by drop. After boiling for 7 hours the alcohol is removed by steam distillation, the residue is extracted with ether and the ethereal solution is shaken with dilute caustic potash solution, dried with potassium carbonate and evaporated. In the vacuum distillation of the ether residue the m-nitrophenyldodecylether distils under 0.5 mm. pressure at 189° C. After cooling it forms light yellow crystals melting at 43° C. By reduction with stannous chloride and hydrochloric acid the m-aminophenyldodecylether, boiling at 204° C. under 0.5 mm. pressure, is obtained which forms colorless crystals melting at 63° C. Its hydrochloride forms colorless crystals melting at 115° C.

*Example 10.*—10 grams of S-methylisothioethyleneurea-hydroiodide, 50 grams of amyl alcohol and 15.2 grams of dodecylamine are heated for 8 hours under reflux until the splitting off of mercaptane has ceased. The mercaptane is filtered with suction and distilled in vacuo. The residue is rendered alkaline, filtered with suction and washed with ligroin to remove the unchanged starting material. After recrystallization from ligroin the base is obtained in colorless crystals. It has the following formula:

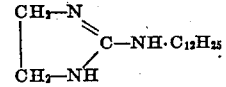

and melts at 86° C.

This application is a division of my copending application for Letters Patent Serial No. 757,457, filed December 14, 1934, now U. S. Patent 2,156,193, issued April 25, 1939.

I claim:

1. A compound selected from the group consisting of mono-guanyl and mono-biguanyl compounds in which a carbon atom of a group selected from the group consisting of the guanyl and biguanyl group is connected with an aliphatic radical of from 10 to 16 carbon atoms by means of an amino group.

2. A compound selected from the group consisting of mono-guanyl and mono-bi-guanyl compounds selected from compounds of the class consisting of compounds of the formulae

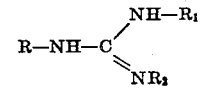

and

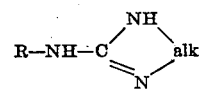

wherein R stands for an aliphatic radical containing 10 to 16 carbon atoms selected from the group consisting of hydrocarbon radicals and of aliphatic radicals containing oxygen as a member of the aliphatic chain and containing sulfur as a member of the aliphatic chain, $R_1$ stands for a substituent selected from the group consisting of hydrogen, alkyl and the guanyl group, $R_2$ stands for a substituent selected from the group consisting of hydrogen and alkyl and alk stands for an alkylene group.

3. A compound selected from the group consisting of mono-guanyl and mono biguanyl compounds of the formula

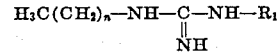

wherein $R_1$ stands for a substituent selected from the group consisting of hydrogen, alkyl and the guanyl group and $n$ stands for one of the numbers 9 to 15.

4. Mono-guanyl compounds of the formula:

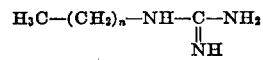

wherein $n$ stands for one of the numbers 9 to 15.

5. The mono-guanyl compound of the formula

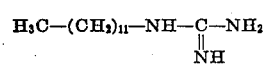

which product melts in the form of the free base at 96° C., in the form of its hydrobromide at 82° C.

BRUNO PUETZER.